T. J. McCOY.
GLASS MANUFACTURE.
APPLICATION FILED NOV. 13, 1913.
1,217,614.
Patented Feb. 27, 1917.
3 SHEETS—SHEET 1.
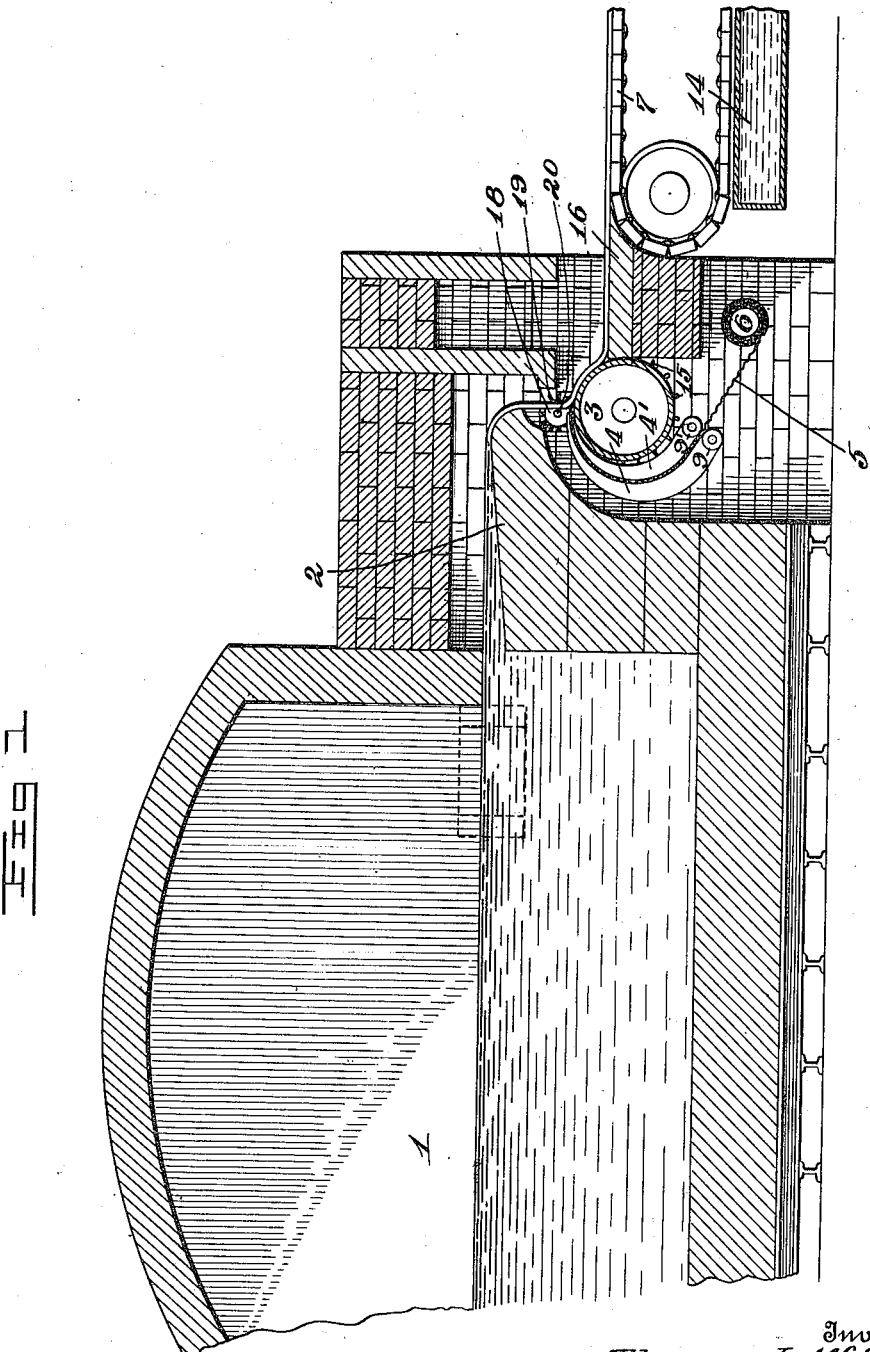

T. J. McCOY.
GLASS MANUFACTURE.
APPLICATION FILED NOV. 13, 1913.
1,217,614.
Patented Feb. 27, 1917.
3 SHEETS—SHEET 2.
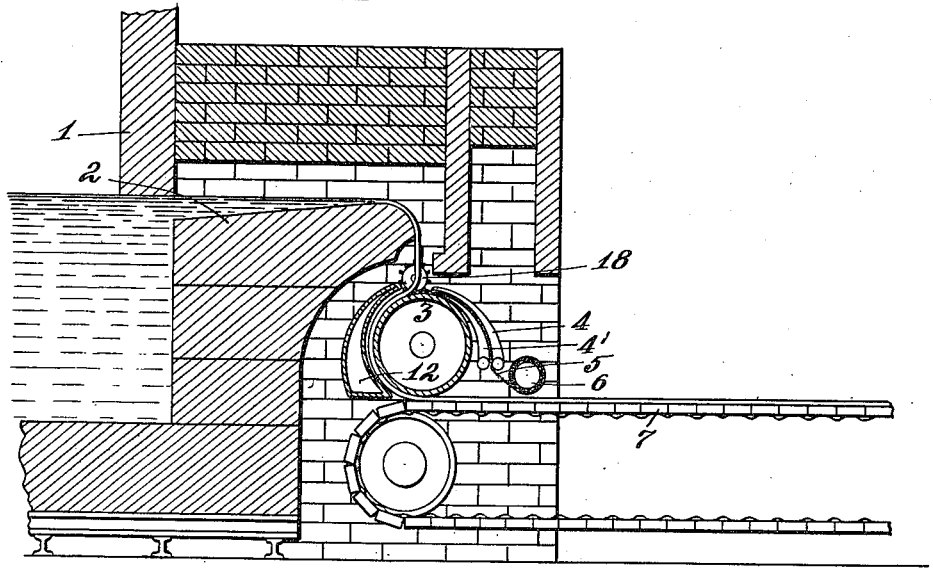
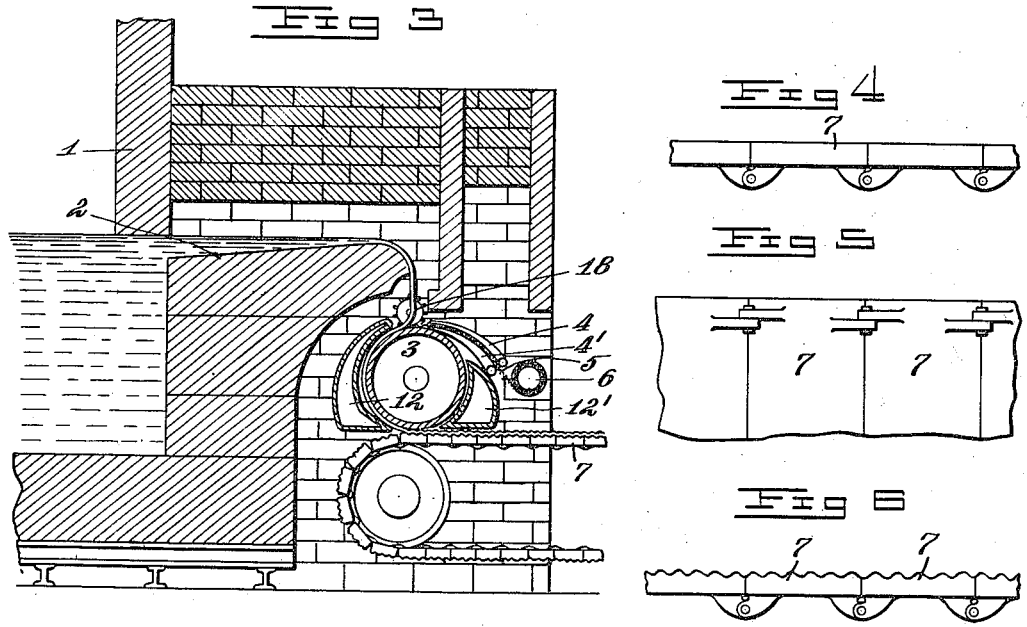
Witnesses
H. C. Robinette
F. Thornett
Inventor
Thomas J. McCoy
By Adrian Dyer
his Attorney

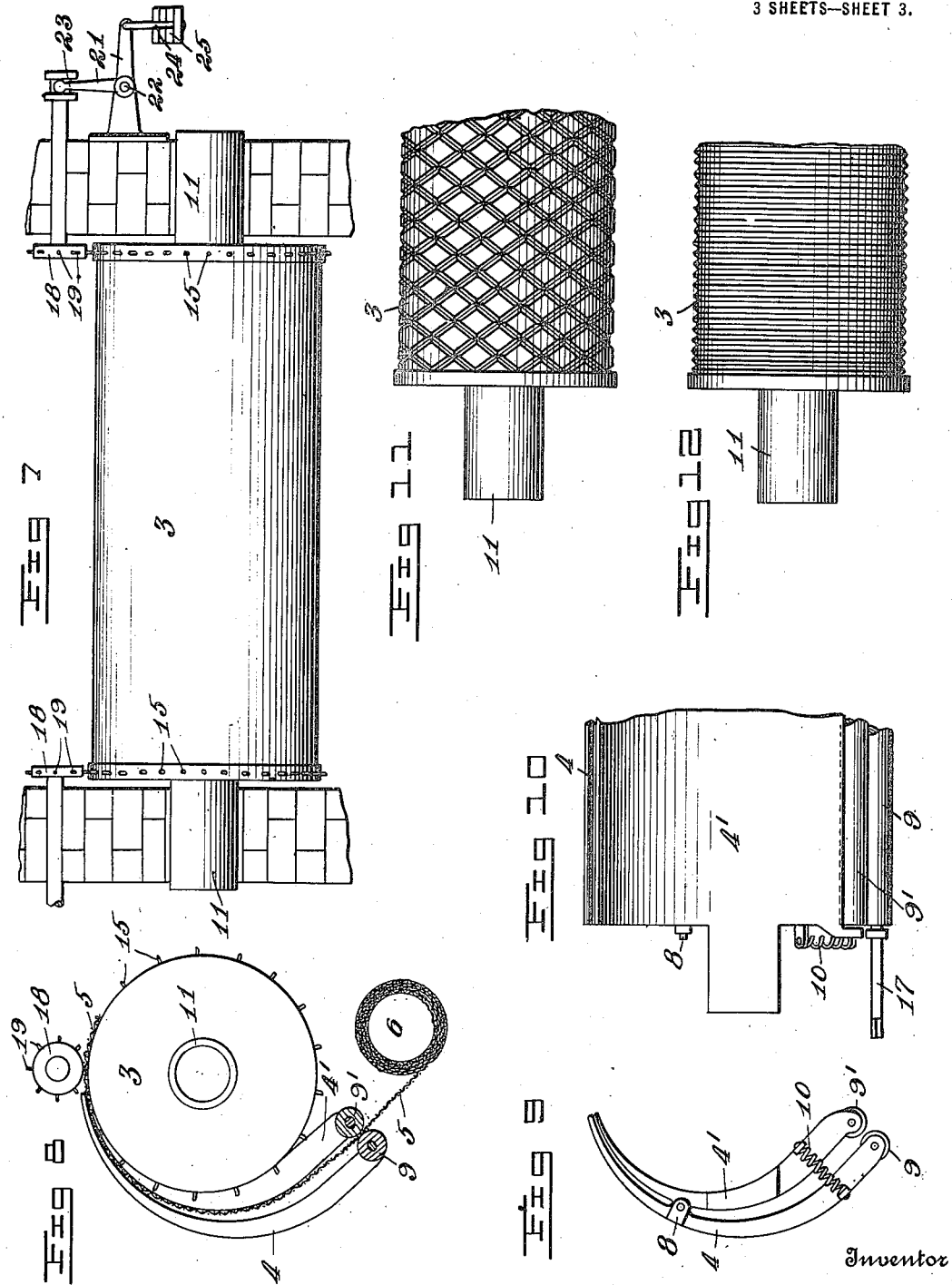

UNITED STATES PATENT OFFICE.

THOMAS J. McCOY, OF KANE, PENNSYLVANIA.

GLASS MANUFACTURE.

1,217,614.  Specification of Letters Patent.  Patented Feb. 27, 1917.

Application filed November 13, 1913. Serial No. 800,750.

*To all whom it may concern:*

Be it known that I, THOMAS J. McCOY, a citizen of the United States, residing at Kane, in the county of McKean and State of Pennsylvania, have invented certain new and useful Improvements in Glass Manufacture, of which the following is a specification.

This invention relates to the formation of sheet glass by machinery, and more particularly to the art of making glass having inlaid therein a trellis or wire netting and commercially known as wire glass.

The primary object of this invention is to dispense with as far as possible the various independent operations now in common use in the manufacture of wire glass, wherein it has been common to form a layer of glass, impress a trellis therein, and reform the surface of the glass by various operations such as rolling or flowing another layer of glass over the trellis.

Experience has shown that where wire glass is formed by rolling out a sheet and impressing a trellis into the top surface thereof, and thereafter closing the impressions by various means, that the trellis becomes distorted and warped, caused by the operation of pressing it into the molten glass while at a high temperature. By my improved process and apparatus I overcome these defects and provide means whereby wire glass may be continuously created from a mass of molten glass by the introduction of the trellis into the glass while the glass is of sufficient fluidity to completely envelop the trellis in the flowing operation, without subjecting the trellis to unnatural strains or causing an uneven chilling of the surface of the glass in the operation of inserting the trellis therein. By the present invention it has been for the first time rendered commercially practical to continuously produce wire glass which shall have a fine finish, and be free from flaws or irregularities commonly found in glass produced by the methods heretofore employed in the production of wire glass.

Another object of my invention is to provide means for producing a configured surface of various designs on one or both sides of the glass conjointly with the flowing and annealing operation. Heretofore attempts to configure wire glass have been subject to many difficulties in that the pressure necessary to impress the trellis in the glass while in a plastic condition would tend to destroy the symmetrical effect of the design as well as interfering with the transparency and brilliancy of the finished product.

By my improved process and apparatus I am able to produce configured glass of any desired design by an impression thereof into the glass after the trellis has been introduced therein, and before the glass has congealed from the flowing temperature and while it yet retains its plastic condition.

I am also able to produce by my improved apparatus other forms and shapes well known in the art, such as Florentine ribbed and fluted surfaces by the application of suitable forming surfaces to the supporting and conveying means upon which the glass is placed while undergoing the congealing stage.

According to the present invention the glass is preferably drawn from a continuous melting tank or furnace, by flowing the glass from a flat spout or apron of novel construction, and introducing into said flow a trellis or wire netting which by the adherence of the glass therewith becomes completely enveloped therein.

The apparatus and method of controlling the supply and flow of glass from the melting tank and the means for operating the conveying means carrying the glass during its congealing period, constitutes no part of this invention, and is not illustrated herein, it being fully illustrated, described and claimed in an application for Letters Patent which I filed May 18, 1911, under Serial No. 627,933.

With these and other objects in view as will more fully hereinafter appear, the invention consists in certain novel features of construction, and arrangement of parts more fully hereinafter described and illustrated in the accompanying drawings and more particularly pointed out in the appended claims, it being understood that various changes in the form, proportion, size, and minor details of construction may be made without departing from the spirit of or sacrificing any of the advantages of the invention.

Figure 1, is a fragmentary sectional view showing the discharge end of the glass tank and accessories, with a sheet of glass being formed from the molten glass in the tank and the means for introducing the trellis therein.

Fig. 2, is a similar view to Fig. 1, this view showing another modification of the trellis feeding means and the movable conveyer.

Fig. 3, is a view similar to Fig. 2, wherein is shown the horizontal conveyer having fluted conveyer bars.

Figs. 4, 5 and 6, show forms of the lateral conveyer surface bars.

Fig. 7, is a plan view of the roller upon which the glass is deposited.

Fig. 8, is an end view of the roller 3 with the wire feeding apparatus in relative position therewith.

Fig. 9, is an end view of the wire feeding and controlling clamp for guiding the movement of the wire.

Fig. 10, is a plan view of the mechanism shown in Fig. 9. Figs. 11 and 12, are enlarged detailed views, with parts broken away of the configurating surfaces adapted to be placed on the roller shown in Fig. 7.

Referring to the drawings, 1 represents the glass tank containing the molten glass. Except as to that portion of the tank from which the glass is flowed or discharged, this tank may be of any desired construction although preferably of such construction as is shown in my prior application heretofore referred to, but as to the discharging or flowing compartment it is of novel construction especially adapted for carrying out my improved process and wherein a flat spout or apron 2 is provided over which the glass is flowed. Located below the flowing end of the apron 2 is a roller 3 suitably mounted for rotative movement, and upon which the glass is deposited after its vertical suspension from the end of the apron 2.

Located in close proximity to the roller 3, are the clamping jaws 4—4', between which the wire netting 5 is introduced and fed from the spool 6. As the wire netting passes from the clamping jaws 4—4' it engages with the spikes 15 protruding from the opposite ends of the periphery of the roller 3, and is carried on by the continuous movement of the roller 3.

As the glass passes from the roller 3, it is deposited upon the cross bars 7, preferably composed of cast iron, and suitably hinged together as shown in Figs. 4 and 5, constituting a horizontal carrier which is provided with any suitable operative means. These cross bars 7 may be provided with a smooth surface as shown in Fig. 4, or they may have a configured fluted or Florentine surface as shown in Fig. 6, depending upon the desired formation of the surface to be imparted to the glass. When it is desired that a smooth surface be given to the glass, the form of cross bar shown in Fig. 4, is used in the conveyer and the position of the conveyer relative to the roller 3, is that shown in Fig. 1, and wherein the glass after leaving the roller 3 passes over a plain surface block 16 and is allowed to partially congeal in such passage, before it reaches and is deposited upon the movable conveyer.

Where it is desired to provide a florentined surface to the glass, the form of cross bar shown in Fig. 6, is used and the position of the conveyer is placed directly under the roller 3, as shown in Figs. 2 and 3. By placing the movable conveyer in this position the cross bars 7 are brought in close relation with the roller 3, and the glass in passing therefrom is immediately deposited upon the cross bars 7, while in a semi-fluid state, and thereby receives the impressions of the cross bars immediately upon its contact therewith.

The particular form of mechanism which I have shown for controlling and guiding the movement of the wire as it is introduced into the flow of glass consists among other parts (see Fig. 9), of two parallel jaws 4—4', being pivotally connected at a point near their center by the knuckle joint 8. Mounted at the ends of the jaws 4—4' at the point where the wire mesh enters are the rollers 9—9' operating to lessen the friction and to straighten out any imperfections in the mesh. To facilitate the introduction and feeding of the wire netting at the beginning of the operation, the roller 9 has an extended shaft portion 17, to which may be fitted a suitable hand operated crank. Located at a point between the rollers 9—9', and the knuckle joint 8, is a coiled spring 10, adapted to provide suitable tension on the wire mesh by the closing of the jaws thereon.

For the purposes of maintaining the wire trellis in a plane formation as the glass is administered thereto, I provide for compensating the natural sag of the trellis, by so forming parallel jaws 4—4', that the space between them through which the trellis passes is curved in cross section; the under jaws 4' being of slightly convex formation by which the center of the trellis is delivered from the jaws at a slightly higher elevation than the edges. By this method of delivery of the trellis from the guiding jaws 4—4' the effect of the natural sag is to adjust the trellis in a plane formation at the point where the trellis is introduced into the glass.

To further provide for maintaining the trellis in a plane formation as the glass is placed in contact therewith, and to thereby maintain the trellis in the center of the sheet of glass, I provide means for imparting a lateral tension to the trellis away from the medial line of and toward the edges of the trellis comprising a wheel 18, adapted for rotative movement, revolving in a vertical plane at each outer edge of the trellis, and engaging the same by suitable pins 19 projecting from the periphery of the wheel 18, which enter the mesh of the trellis as it emerges from the guiding jaws 4—4'. The wheel 18, is mounted upon a suitable shaft 20, journaled in any suitable supporting means to permit of the shaft being moved longitudinally. At the outer end of the shaft 20, is fitted suitable means for administering an outward tension thereto, and in the apparatus shown, a bell crank 21, is suitably pivoted at 22 with its vertical arm 23, engaging the end of the shaft 20. To the horizontal arm of the bell crank 21 is attached a pendant 24 having suitable weights 25 suspended thereon. By this means the wheels 18 are provided with a continuous outward tension and continue to revolve and engage the wire mesh as it is passed over the roller 3.

The roller 3 is provided with hollow trunnions 11, into which may be introduced by suitable means any cooling fluid, to properly regulate the temperature of the surface of the roller upon which the glass is deposited. For the purpose of producing configurations of various designs I provide suitable coverings for the roller 3 comprising a matrix detachably connected thereto. For the further purpose of providing suitable cooling means to control the temperature of the glass as it comes from the apron 2 I locate as shown in Figs. 2 and 3, suitable containers 12—12' for fluid cooling means which may be fed from any suitable supply. For the purposes of controlling the temperature of the horizontal conveyer 13, I provide suitable cooling means comprising a tank 14 located directly under and in close proximity to the conveyer 13. This tank may be adapted to receive any suitable cooling fluid in like manner to the tanks 12—12'.

Operation.

The mass of molten glass in the supply tank having been brought to a proper working condition, the wire mesh 5 is introduced between the rollers 9—9' of the clamping jaws 4—4' and is fed therethrough until it has passed over a part of the periphery of the roller 3 containing the protruding spikes 15 which engage the edges of the wire mesh and is conveyed thereby to a point where it reaches the horizontal conveyer 13. At this point the glass is caused to flow over the apron 2. The horizontal conveyer mechanism is then placed in motion. As the glass flows over apron 2, it is suspended in a vertical position until it comes in contact with the wire trellis passing over the roller 3. As the glass is in a semi-plastic condition it adheres to and completely envelops the wire trellis and forms a smooth layer of glass on both sides of the trellis and passes through a gradual cooling and congealing stage in passing over the horizontal conveyer.

As the sheet of glass leaves the horizontal conveyer it is conveyed upon suitable supporting means from the leer where the sheet of glass may be cut by any suitable means into proper lengths for the treatment and handling by the cutters, who in turn cut the sheets into varying commercial sizes.

Where it is desired to provide a configured surface to the glass, a matrix of any suitable design may be attached to the roller 3, and as the glass emerges from the spout 2 and is introduced into the wire trellis passing out of the jaws 4—4' (see Fig. 2) it is deposited upon the roller 3 and therefrom is placed on the surfaces of the conveyer bars 7 while yet in a sufficiently plastic condition to cause the configurations on the roller 3 to be impressed on the one side of the glass and the configurations of the bars 7 comprising the horizontal conveyer to be impressed upon the other side of the glass as may be desired.

Many of the features of this invention may be used without employing all of them as some of those which are non-essential may be omitted without departing from the spirit of the invention. Moreover the apparatus portion of the invention is capable of receiving various mechanical expressions without departing from the spirit of the invention itself.

Having thus described my invention what I claim as new and desire to secure by Letters Patent is:

1. An apparatus of the character described comprising a receptacle for containing molten glass means for receiving and conveying the glass as it flows from said receptacle comprising a rotary conveyer, means for introducing a wire trellis into the glass at a point between the receptacle and the rotating conveyer, means for maintaining a lateral tension to the trellis during the glass coating operation, means for applying a configured surface to the glass by its contact with said rotary conveyer means for supporting and conveying the glass in a horizontal plane during the congealing period, and means for applying a configured surface to the glass by its contact with said horizontal supporting and conveying means.

2. An apparatus of the character described, comprising a receptacle for containing molten glass, means for receiving and conveying the glass as it flows from said receptacle comprising a rotary conveyer, means for applying a cooling agent to said rotary conveyer, means for introducing a wire trellis into the glass at a point between the receptacle and the rotary conveyer, means for maintaining a lateral tension to the trellis during the glass coating operation, means for applying a configured surface to the glass by its contact with said rotary conveyer, means for applying a cooling agent to the glass coated trellis while receiving said configured surfaces, means for supporting and conveying the glass in a horizontal position during the congealing period, and means for applying a configured surface to the glass by its contact with said horizontal supporting and conveying means.

3. An apparatus of the character described, comprising a receptacle for containing molten glass, means for receiving and conveying the glass as it flows from said receptacle comprising a rotary conveyer, means for introducing a wire trellis into the glass at a point between the receptacle and the rotary conveyer, means for compensating for the natural sag of the wire trellis by feeding it between two curved surfaces, normally elevating the medial line of the trellis at a point prior to its contact with the glass during the coating operation, means for applying a configured surface to the glass by its contact with said rotary conveyer, means for supporting and conveying the glass in a horizontal position during the congealing period, and means for applying a configured surface to the glass by its contact with said horizontal supporting and conveying means.

4. An apparatus of the character described, comprising a receptacle for containing molten glass having a horizontal discharge opening therein, means for supporting a roll of wire trellis adjacent to said opening, means for applying a positive movement to the trellis, means for introducing the trellis into the glass in a convex concave formation, means for applying plastic glass to said trellis, and means for conveying the glass coated trellis in a horizontal plane during its congealing period.

5. An apparatus of the character described, comprising a receptacle for containing molten glass having a horizontal discharge opening therein, means for supporting a roll of wire trellis in close proximity to said discharge opening, means for applying positive movement to the wire trellis, means for introducing the trellis into the glass flow with its medial line elevated above the outer edges, means for applying molten glass to said trellis with its medial line in said elevated position, means for reducing the medial line of the trellis into plane formation with the edges as the glass is applied thereto, and means for conveying the glass coated trellis in a horizontal plane during its congealing period.

6. An apparatus of the character described, comprising a receptacle for containing molten glass, having a discharge opening of gradual diminishing depth, means for supporting a roll of wire trellis in close proximity to said discharge opening, means for applying positive movement to the trellis, means for maintaining the cross section of said trellis in an upwardly curved formation, means for applying molten glass to said trellis while in said upwardly curved formation, means for reducing the upwardly curved formation to a horizontal line during the glass applying movement, means for applying a cooling agent to the glass coated trellis, and means for conveying the glass coated trellis in a horizontal plane during its congealing period.

7. An apparatus of the character described, comprising a receptacle for containing molten glass having a discharge opening of gradual diminishing depth, means for supporting a roll of wire trellis in close proximity to said discharge opening, means for applying positive movement to the trellis, means for maintaining a retarding tension to the trellis by feeding it between two co-acting surfaces normally held in retracted position, means for delivering the trellis from said co-acting surfaces concave convex in cross section, means for applying molten glass to said trellis in close proximity to the tension producing means, means for applying a cooling agent to the glass coated trellis, means for conveying the glass coated trellis in a horizontal plane during its congealing period upon a rotating conveyer, and means for applying a configured surface to the glass by its contact with said horizontal conveyer.

8. The method herein described, which consists in flowing a sheet of glass from a molten mass by the pressure of such mass, introducing a moving trellis into the path of said flow, maintaining the cross section of said trellis in concave convex formation during its initial application to said glass, reducing the cross section from the concave convex formation into a plane formation by subjecting the trellis to a tension away from the medial line of, and toward the edges thereof, during its contact with said glass, allowing the tension to relax after its contact with said glass, and simultaneously applying a cooling medium thereto.

In testimony whereof I have affixed my signature in presence of two witnesses.

THOMAS J. McCOY.

Witnesses:
H. H. McGouan,
J. D. Kane.